United States Patent [19]
MacPhee et al.

[11] 3,763,422
[45] Oct. 2, 1973

[54] METHOD AND APPARATUS FOR ELECTROCHEMICAL ANALYSIS OF SMALL SAMPLES OF BLOOD

[75] Inventors: John MacPhee, Chelmsford; James H. Mowbray, Holliston; Daniel C. Noonan, Norwood; Joseph A. Remillard, Framingham; Robert L. Scott, Medfield, all of Mass.; Henri M. Deninger, deceased, late of Stoughton, Mass. by Barbara N. Deninger, administratrix

[73] Assignee: Corning Glass Works, Corning, N.Y.

[22] Filed: Oct. 21, 1971

[21] Appl. No.: 191,211

[52] U.S. Cl. ............ 324/30 R, 23/230 R, 204/1 T
[51] Int. Cl. ............................................ G01n 27/42
[58] Field of Search ................ 324/29, 30 R, 30 B, 324/30 C; 204/1 T, 195; 23/230 B

[56] References Cited
UNITED STATES PATENTS

| | | | |
|---|---|---|---|
| 3,639,829 | 2/1972 | Harnocourt | 324/30 C |
| 3,357,910 | 12/1967 | Shiller | 204/195 |
| 3,556,950 | 1/1971 | Dahms | 324/29 |

OTHER PUBLICATIONS

A. H. J. Maas–pH Determination of Body Fluids . . . Clin. Chem. Acta–28–1970, pp. 373–390.

G. W. Neff et al. A Computer Assisted Electrode System . . . Clinical Chemistry 16(7) 1970 pp. 566–572

*Primary Examiner*—Michael J. Lynch
*Attorney*—Clarence R. Patty, Jr. et al.

[57] ABSTRACT

A system for determining values of pH, $PCO_2$, $PO_2$, $HCO_3$, total $CO_2$ and base excess in a small sample of blood. The system comprises a measuring chamber common to the sensing portions of a flow-through pH electrode, a pH reference electrode, a carbon dioxide ($PCO_2$) electrode, and an oxygen ($PO_2$) electrode. In line and communicating with the chamber exit is a peristaltically activated pump which can draw small samples of blood into the chamber followed by a vacuum system for drawing the sample out of the chamber. Communicating with the chamber entrance is a flush system for cleansing the chamber after the blood has been analyzed. The system also includes circuitry associated with the output of the electrodes for quickly determining and digitally displaying values for pH, $PCO_2$, and $PO_2$, and analogue calculators adapted to receive and apply values from the pH and $PCO_2$ electrodes to determine and digitally display values for $HCO_3^-$, total $CO_2$, and base excess.

10 Claims, 3 Drawing Figures

METHOD AND APPARATUS FOR ELECTROCHEMICAL ANALYSIS OF SMALL SAMPLES OF BLOOD

BACKGROUND OF THE INVENTION

1. Field of the Invention

This invention relates generally to methods and instruments for quickly and accurately determining values for various constituents of blood. More specifically, the invention relates to methods and systems for measuring pH, $PCO_2$, $PO_2$, and deriving $HCO_3^-$, total $CO_2$ and base excess values from a single stationary sample of blood.

The clinical importance of knowing values for the above measurements in a blood sample and their relationships to each other is well known. For example, by knowing values for the above species in a given blood sample, it is often possible to pin-point one or more causes of physiological distress such as those caused by respiratory or renal inefficiencies. As an aid to understanding the scope of the present invention, the following definitions of terms are offered. The terms are defined with respect to their commonly accepted clinical usage.

The term pH has the same meaning as in general chemistry, e.g., it represents a number corresponding to the negative logarithm of the hydrogen ion concentration in a sample. In discussing the pH of blood, the nomenclature differs slightly from the classical nomenclature in which a pH of 7.0 is taken to represent an essentially neutral solution. For convenience, clinicians have taken the limits of blood pH found in many pathologic conditions and based their terminology and scale upon this range. Thus, the commonly accepted normal value of blood is pH 7.35 – 7.47 rather than 7.0. The blood pH range commonly accepted to include all pH unbalances is pH 7.0 – 8.0, or one pH unit. Because most blood pH measurements are within a range of only one pH unit, it is clear that the value of the measurement increases with the accuracy of the pH determination.

The terms $PCO_2$ and $PO_2$ refer to the partial pressures, expressed in mm of mercury, of $CO_2$ and $O_2$ in the sample.

The term $HCO_3^-$ refers to bicarbonate concentration usually expressed in milliequivalents per liter or $m$ Eq/1.

The term base excess, derived from pH and $PCO_2$, refers to a diagnostically useful numerical value which can be calculated when pH, $HCO_3^-$, and hemoglobin level of a sample are known.

The term total $CO_2$ refers to the sum of the $HCO_3^-$ and $H_2CO_3$ calculated from the $PCO_2$ of a sample. Total $CO_2$ is usually reported in millimoles per liter or $m$ M/1.

Further information regarding accepted terminology may be found in Annals New York Academy of Sciences, Report of ad hoc Committee on Acid-Base Terminology, Vol. 133, pp. 251–258 (1966).

Various methods and systems for determining blood values for the above terms have been used and are well known.

2. Prior Art

There have been several relatively recent disclosures relating to methods, instruments, and systems for the electrochemical analysis of fluids such as blood. For example, in U.S. Pat. No. 3,505,195, there are disclosed electrode systems for measuring one or more of the constituents of blood which have been described above. More specifically, there is disclosed (e.g. in FIGS. 11 and 12) a measuring chamber which is common to the sensing portions of a pH electrode, a reference electrode, a $PCO_2$ electrode, and a $PO_2$ electrode, at least one of which comprises the bottom of the chamber. In that disclosure the pH electrode is of the so-called "dip" type. The sensing portion of that type of electrode is commonly a membrane across which the concentration of hydrogen ions can be "sensed". The above patent describes how the sensing portions of the pH electrode, a reference electrode, and $PCO_2$ and $PO_2$ electrodes can be placed about a common measuring chamber so that at least three determinations can be made from a single sample of blood. Also disclosed are methods and electrode systems for sequentially measuring values in a sample.

In U.S. Pat. No. 3,556,950, there is disclosed another method and apparatus for automatic electrochemical analysis. The disclosed apparatus consists of a reference electrode and a plurality of other electrodes responsive to the presence of ions and dissolved gases such as $O_2$ and $CO_2$. The apparatus is calibrated in situ by immersing the electrodes in at least two standard solutions which contain different known concentrations of the ions and dissolved gases. After calibration, a sample of fluid containing unknown concentrations of ions and dissolved gases is introduced into the system. The electrical outputs of each of the electrodes relative to a reference electrode are sequentially obtained. Actual measurements for ions or gases are carried out in separate chambers, each of which houses the sensing portion of the various electrodes that may be used. Through a series of relay switches and related circuitry, a single sample can be analyzed and the results can be fed into a data processor.

In U.S. Pat. No. 3,357,910, assigned to the same assignee as the present invention, there is disclosed a flow-through electrode which can be used to measure pH in fluids. Various advantages in using a flow-through electrode instead of a dip-type electrode are disclosed and those disclosures are incorporated by reference into the present disclosure. Some of the advantages associated with a flow-through pH electrode are greater sensitivity, carefully regulatable temperature, and anaerobic measuring conditions.

In U.S. Pat. No. 3,505,196, there is disclosed a reference electrode structure which is designed to overcome what is known in the art as "hysteresis". Hysteresis is an effect which causes instability and inaccuracy in a reference electrode because the wick normally utilized in most commercial electrodes does not have time to clear itself of the solution into which it was dipped before the next measurement must be made. This failure of the wick to clear itself tends to give unreliable data from one measurement to the next. By the novel construction of the disclosed reference electrode, the effects of hysteresis are said to be essentially overcome.

In a brochure entitled "New Corning Digital Model 160 pH/Blood Gas System" distributed by Corning Scientific Instruments, Medfield, Mass., there is disclosed a system for determining pH, $PCO_2$, and $PO_2$ of small samples of blood. In that system, however, the pH measurement is made in a flow-through chamber separate from the chamber used for gas measurements.

Various methods for measuring blood pH, $PCO_2$, and $PO_2$ with the aid of computors have been recently disclosed. See for example, Neff et al., "A Computer-Assisted Electrode System for Measuring Blood pH, $PO_2$, $PCO_2$, Sodium, and Potassium", Clinical Chemistry, Vol. 16, No. 7, p. 567 (1970), and Clinical Chemistry, Vol. 17, No. 6, p. 557 (1971), last column, bottom.

In an article by A. H. J. Maas, in Clinical Chim. Acta., 28, pp. 373–390 (1970), calibrating methods for blood pH determinations are reviewed.

The above disclosures, all relatively recent, tend to emphasize the growing importance of developed and developing methods and systems for providing quick and accurate measurements of the constituents of blood so that various illnesses can be properly diagnosed.

One of the more important requirements for a blood pH-gas measuring system is that it should be capable of measuring a sample under conditions which can be readily controlled. For example, the sample is ideally measured under anaerobic conditions, at a carefully controlled temperature (e.g. about 37°C.), with a minimum amount of movement of the sample from one container to another. Also, the system should be capable of measuring relatively small sample quantities since, in many instances, only a small sample is available, e.g., blood taken from a fingertip or earlobe in a capillary glass tube. Other desirable testing conditions are known to those skilled in the art.

It is known, however, that the accuracy of blood sample measurements depends on many factors, some of which have not yet been fully controlled by known blood-measuring systems. For example, in measuring a sample, it is important to avoid exposure of the sample to air, the entrapment of air bubbles, and the exposure of the sample to unnatural environments. Unfortunately, known systems for measuring blood samples, even though highly automated, often require a series of undesirable movements or transfers of a sample from one container (or measuring chamber) to another. With this movement, there is introduced the possibility of testing condition variables which may not only affect the accuracy of measurements, but also the physical condition of the sample. For example, with any movement of the sample from one chamber to another, there is introduced the possibility of sample temperature gradients which may affect accuracy and which are desirably avoided. Also, the contact of a blood sample with the walls and contents of various containers may introduce the possibility of physical changes in the sample due to environmental changes. Further, once a sample has passed from one measuring chamber to another, its physical character may be changed so that initial measurements cannot be repeated.

In those systems where the movement of a sample is minimized (e.g., less automated systems), there are commonly introduced disadvantages associated with the manual steps necessary for measurements, e.g., accidental loss of sample because of manual mistake, or undesirable exposure to air which may affect pH and gas values.

It is, therefore, a primary object of the present invention to provide a blood pH-gas measuring system adapted to simultaneously measure pH, $PCO_2$, and $PO_2$ in a stationary sample under anaerobic conditions which sample is maintained at a controlled temperature.

It is another object to provide a system which requires a minimum amount of transfer of the sample from one environment to another.

It is another object to provide a system wherein reasonably accurate repeatable measurements are possible.

It is yet a further object to provide a system which measures a sample anaerobically without the entrapment of air bubbles.

It is a further object to provide a system in which a small sample of blood, less than about 220 ul, can be repeatedly measured.

It is also an object to provide a measuring chamber which can be readily flushed clean after sample measurements have been taken.

It is yet a further object to provide a measuring system with circuitry adapted to display the measured values of pH, $PO_2$, and $PCO_2$, and calculators adapted to derive from the pH and $PCO_2$ values, further values for $HCO_3^-$, total $CO_2$ and base excess which further values are also displayed.

It is yet a further object to provide a measuring chamber which is simply constructed and adapted to permit the removal, repair, or replacement of electrodes.

It is yet still a further object to provide a measuring chamber into which a small sample can be controllably drawn.

These, and other objects, which will become apparent, are discussed in detail below.

SUMMARY OF THE INVENTION

We have surprisingly discovered a method and system for electrochemically analyzing a small, single sample of blood which requires only a single transfer from a sample container to a single measuring chamber wherein pH, $PCO_2$, and $PO_2$ are anaerobically measured at a controlled temperature in a quick and accurate manner. The system comprises, in combination, a single measuring chamber common to the sensing surfaces of a flow-through pH electrode, the sensing portions of a pH reference electrode, a $PCO_2$ electrode, and a $PO_2$ electrode; a peristaltically activated micro-sampling pump which communicates with the exit of the measuring chamber; a vacuum system also in communication with the chamber exit and beyond the micro-sampler; a flush system communicating with an entrance to the chamber, said flush system activatable by and with the vacuum system; circuitry electrically associated with the outputs of the sensing electrodes, and adapted to determine and display the pH, $PCO_2$, and $PO_2$ of a sample; and calculators in electrical circuit with the outputs of the pH and $PCO_2$ electrodes which are adapted to receive and apply values from the pH and $PCO_2$ electrodes to derive and display values for $HCO_3^-$, total $CO_2$, and base excess.

SPECIFIC EMBODIMENTS

Figure 1:
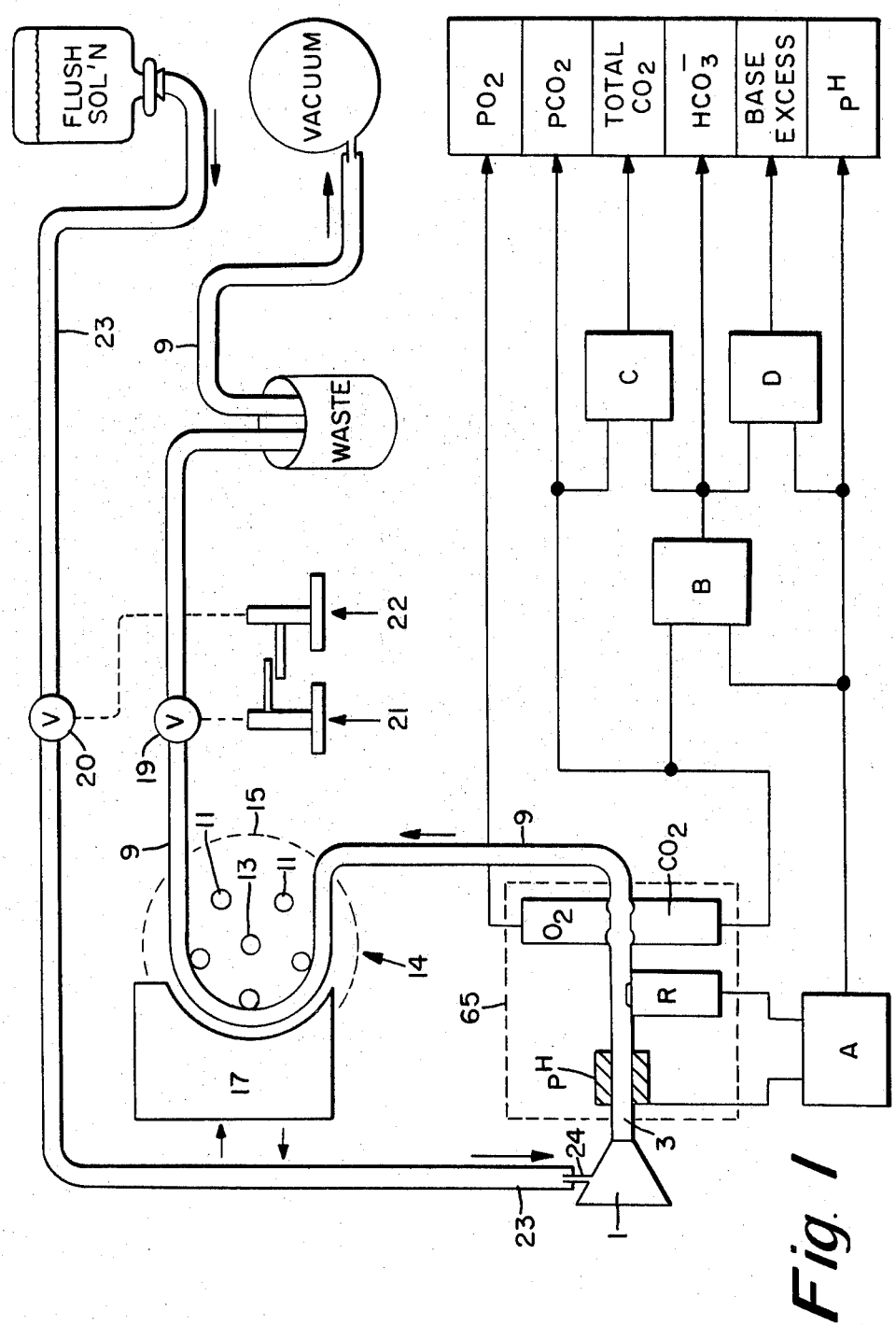
FIG. 1 is a flow-through diagram showing the overall relationship of certain components forming part of the present invention.

The overall functions of the system of the present invention can be seen in FIG. 1 which is merely a diagrammatic flow chart and it is not intended to describe a fully operable system. Those skilled in the art will recognize that certain equipment (e.g., gas calibration systems) have been left out for clarity.

According to the representative flow chart shown in FIG. 1, a blood sample is introduced into the system through an entry port 1, which is shown to be generally luer-like or funnel-shaped. It is not essential that the port 1 be funnel-shaped, but such a configuration has been found convenient for receiving the tip of a blood sample-containing syringe, which is usually conical, or a rubber adaptor cone attached to a blood-containing capillary tube. If the sample to be measured is contained in a syringe, the sample may be injected directly into the sample measuring chamber by using the syringe plunger. The minimum volume of sample injected into the measuring chamber 3 can be determined by means discussed below. Preferably, the amount of sample needed will not exceed one-half cc. When a syringe is used to introduce a sample, the exit from the chamber 3 should be free to accept the air of the chamber which is displaced by the syringe-fed sample. If the sample is initially contained in a capillary tube, the following method of sample introduction may be used.

The adapter tip of the sample containing capillary tube is placed snugly into the entry port 1, and a small portion of the blood is drawn into the sensing chamber 3 by activating the control wheel 15 of a micro-sampling peristaltic pump 14. The peristaltic action of the pump is accomplished by first moving a slideable cam 17 toward the axis 13 of the pump 14 to achieve a slight pinching effect on a plastic or rubber tube 9 which leads from the sample chamber 3 to the pump 14. The distance from the sample chamber 3 to the pump 14 is about 5 inches in an actually constructed model, although the length may vary to satisfy engineering requirements. The tubing 9 may be of an elastomer material such as surgical latex. Once the cam 17 of the micro-sample 14 is in the closed position (e.g., pressing against the tubing 9), the peristaltic effect is achieved by activating a plurality of rollers 11 placed about the axis 13. The rollers 11 are attached to the control wheel 15 and rolled against the tubing by manually or otherwise turning the control wheel 15. The amount of turning of the control wheel 15 needed to draw a small sample into the sample chamber 3 can be determined by turning the wheel slowly until a blood sample is visible through a sample viewer (not shown in FIG. 1 but shown in FIG. 2 where the sample chamber is described in detail).

Once the sample has been drawn into the sample chamber 3, it is in contact with and can complete the circuits of sensing electrodes for measuring pH, $PCO_2$, and $PO_2$, all of which are described in detail below. While the sample is in the sample chamber 3 the various constituents of blood are measured by completing the electrical circuits shown very generally in FIG. 1.

The leads from the flow-through pH electrode and the reference electrode, designated by R, are in circuit with a high impedance differential amplifier shown generally by box A. From box A, the pH value of the sample can be expressed through known circuitry in a digital manner shown generally in the pH box at the lower right of FIG. 1. All six values so shown in FIG. 1 are expressed digitally by completing the circuits of the electrodes shown, e.g., $PO_2$ and $PCO_2$ are digitally displayed by inserting the appropriate circuitry between the outputs of those electrodes and a digital viewing screen. The values for total $CO_2$, $HCO_3^-$, and excess base are determined through and logue calculators labelled B, C, and D. Those values are also displayed digitally and such calculations are based on inputs from the pH and $PCO_2$ electrodes, discussed below.

After the desired digitally expressable values are determined from the sample, the sample is semi-automatically removed from the sample chamber 3 by the flush and vacuum systems generally shown in FIG. 1. As can be seen, both a flush system and vacuum system communicate and are in line with the sample chamber 3 by means of tubing 9 for the vacuum system and tubing 23 for the flush system.

The operation of the flush system and vacuum system are controlled by valves designated by V which may be of the pinch-valve type. Opening and closing of the valves may be controlled by valve keys 21 and 22 which control the vacuum valve 19 and the flush valve 20, respectively. When valve key 21 is activated, such as by depressing in the direction of the arrow the measured blood sample is drawn from the chamber 3 through tubing 9, past the micro-sample 14 into a sealed waste container (WASTE) by means of a partial vacuum. Preferably, the vacuum is capable of drawing about 1 to 1.5 liters of air per minute through the chamber. For the vacuum system to be operable upon depression of the valve key 21, the cam 17 of the micro-sampler should be disengaged or moved away from tubing 9 and the sample container used to introduce the sample into the port 1 must be removed to permit air to be drawn into and through the sample chamber.

The flush system and FLUSH SOL'N flow is controlled by flush valve key 22. To open the flush system, flush valve key 22 is activated as, for example, in the direction of the arrow and both the flush tubing 23 and vacuum tubing 9 are opened because an extension on the shaft of the flush valve key 22 engages vacuum valve key 21. Thus, by activating flush valve key 22, the vacuum system is activated with the effect that FLUSH SOL'N is drawn from a container through flush tubing 23, through an atomizing capillary 24, and into the port 1 and measuring chamber 3 by means of in-rushing air which is drawn in by the partial vacuum system. The atomized FLUSH SOL'N may be distilled water, saline, or any other solution compatible with the system of FIG. 1 which will cleanse the sample chamber and tubing 9 when drawn therethrough. The FLUSH SOL'N may be partially gravity fed by hanging the bottle above the chamber 3. The flush system tubing 23 may be of material such as plastic or rubber and is preferably transparent to permit convenient viewing of the flush operation.

One of the more critical features of the system shown very generally in FIG. 1 is the sample chamber 3 and the location of the related electrodes whose sensing portions form portions of the walls thereof. This chamber 3 which is included generally by the box of dotted lines 65 of FIG. 1, and its associated structures, are shown more clearly and accurately in FIGS. 2 and 3.

Figure 2:
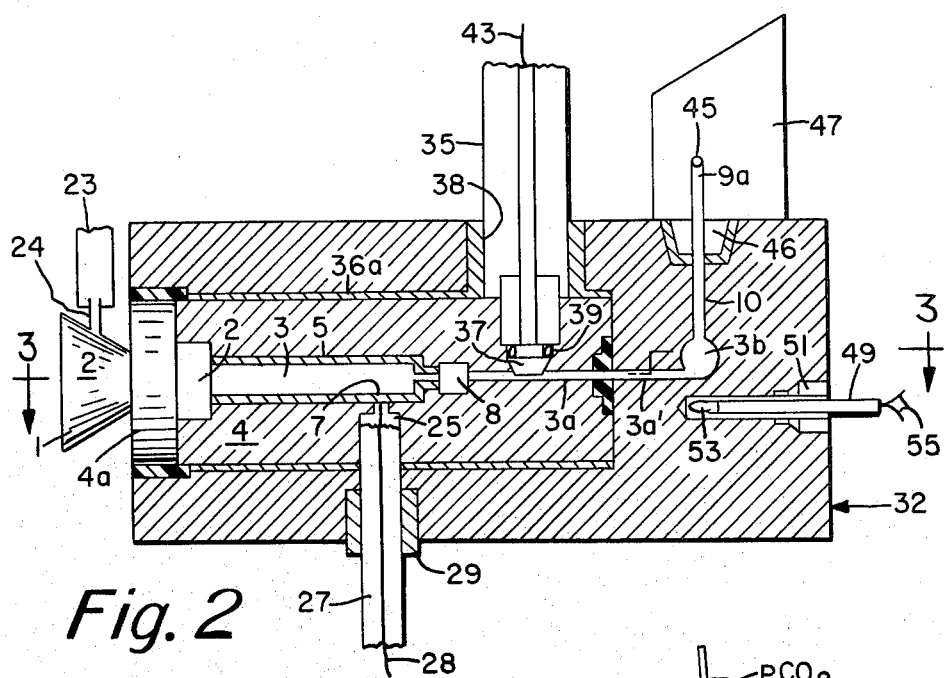
FIG. 2 is a vertical cross-section of the housing for a measuring chamber similar to the one shown very generally in FIG. 1.

FIG. 2 represents a generally schematic vertical cross-section of a stainless steel sample chamber housing 32 and its associated structures. FIG. 2 is shown in block form, and not in actual scale, to clearly show the overall sample measuring chamber 3–3a–3a'–3b and its position relative to other structures. The entry port 1 of the pH measuring portion of the chamber 3 consists of an opening defined by a luer fitting 2 which may be made of a plastic material such as an acetal resin known as Dupont Delrin acetal resin copolymer. In a preferred embodiment, the luer fitting is somewhat funnel-shaped and adapted to receive the tip of a syringe or a conical capillary tip adapter. The luer fitting 2 has a laterally extending capillary tube 24 of about 0.035 to 0.050 inch I.D. which forms a passageway between the entry port 1 and the flush tubing 23. The entry port 1 feeds into a stainless steel and plastic flow-through pH electrode assembly 4 which is shown inserted into the sample chamber housing 32 and held in place by a stainless steel electrode retainer 4a. The pH electrode assembly 4 houses the flow-through pH sensitive glass capillary tube 5 which is of the kind described generally in U.S. Pat. No. 3,357,910 (e.g., a Corning Code 0150 vanadium clad pH sensor glass with a solid fused crystalline layer of silver halides through which is coiled an Ag wire). The inner diameter of the pH sensor capillary tube 5 is about 0.030 inch. The tube 5 is about 1 ½ inches in length.

Inserted into an opening (not numbered) in the housing 32 and in electrical contact with the coiled Ag wire of the pH capillary tube 5 is the tip 7 of a pH electrode contact insert 27 held in place by a metal (e.g., stainless steel) retainer 29. Emerging from the contact insert 27 is an insulated lead 28 in electrical contact with the tip 7 so that, in operation, the lead 28, when placed in circuit with a similar lead emerging from the reference electrode, completes the circuit required for a pH reading.

Continuous with and connected with the pH chamber by a non-conductive seal 8, and forming a portion of the overall sample measuring chamber 3–3a–3a'–3b, is a flow-through capillary canal 3a.

In sealed contact with the canal 3a, which is machined into the pH electrode assembly 4, is the sensing or liquid junction portion 37 (held in place by an O-ring 39) of a pH reference electrode 35. The reference electrode is held in place in the chamber housing 32 by means of a plastic electrode retainer 38. It should be noted that in FIG. 2, the pH reference electrode is disposed vertically toward the overall measuring chamber 3–3a–3a'–3b. (In FIG. 1 the reference electrode R is diagrammatically illustrated as disposed horizontally toward the overall measuring chamber for clarity only.) The pH reference electrode is of the conventional type but with two exceptions. Firstly, the surface area of the electrolyte contained in the reference electrode which comes in contact with the sensitive membrane 37 is less than the surface area of the membrane 37 in contact with a sample. This provides a "wick" between the sample and the electrolyte which avoids hysteresis and related problems. Secondly, the reference electrode utilizes a NaCl electrolyte bridge (not shown, but discussed below) instead of the conventional saturated KCl bridge.

The canal 3a sealably communicates with canal 3a' which is continuous with, and extends tangentially into, the final gas measuring cavity 3b of the overall measuring chamber 3–3a–3a'–3b. The inner wall of the stainless steel gas measuring chamber 3b is Teflon-coated, generally cylindrical, and the chamber is about ¼ inch diameter, and preferably less than about one-half inch long. It is important that the canal 3a' feeds substantially tangentially into the gas measuring chamber 3b to impart a counter-clockwise motion to samples which flow into the chamber 3b. This substantially tangential introduction of a sample avoids the trapping of air bubbles by forcing any air upwardly and out of the chamber 3b through exit canal 10 which is in line with and about perpendicular to the gas measuring chamber 3b and about 1/16 inch I.D. Like canal 3a', chamber 3b and exit canal 10 are machined into chamber housing 32. Canal 3a, which is housed by the pH electrode assembly 4, communicates and is continuous with canal 3a' which is machined into the overall housing block 32. Canal 3a is in sealed relationship with canal 3a' by means of a non-conductive plastic seal shown where canal 3a communicates with canal 3a'.

The sensing portions of the $PCO_2$ and $PO_2$ electrodes (not shown in FIG. 2) extend slightly into and form a portion of the inner wall of the gas measuring chamber 3b from two sides perpendicular to the plane of FIG. 2.

Situated slightly below (about one-fourth inch) the gas measuring chamber 3b is the heat sensitive portion 53 of a conventional thermistor 49 retained in housing 32 by a rubber retainer 51. Emerging from the thermistor are two leads 55 which are connectable to a suitable temperature displaying device (not shown). The thermistor may be of any kind which can accurately measure temperatures at about 37°C.

Above the gas measuring chamber 3b is a transparent plastic sample viewer 47 retained in chamber housing block 32 by transparent fitting 46. The sample viewer houses a canal 9a in sealed relationship and in continuous communication with exit canal 10 of the gas measuring chamber 3b and extending laterally out of the sample viewer 47 at about point 45 where it is connectable to the vacuum system tubing 9 (not shown in FIG. 2) after it emerges from the sample viewer 47.

Figure 3:
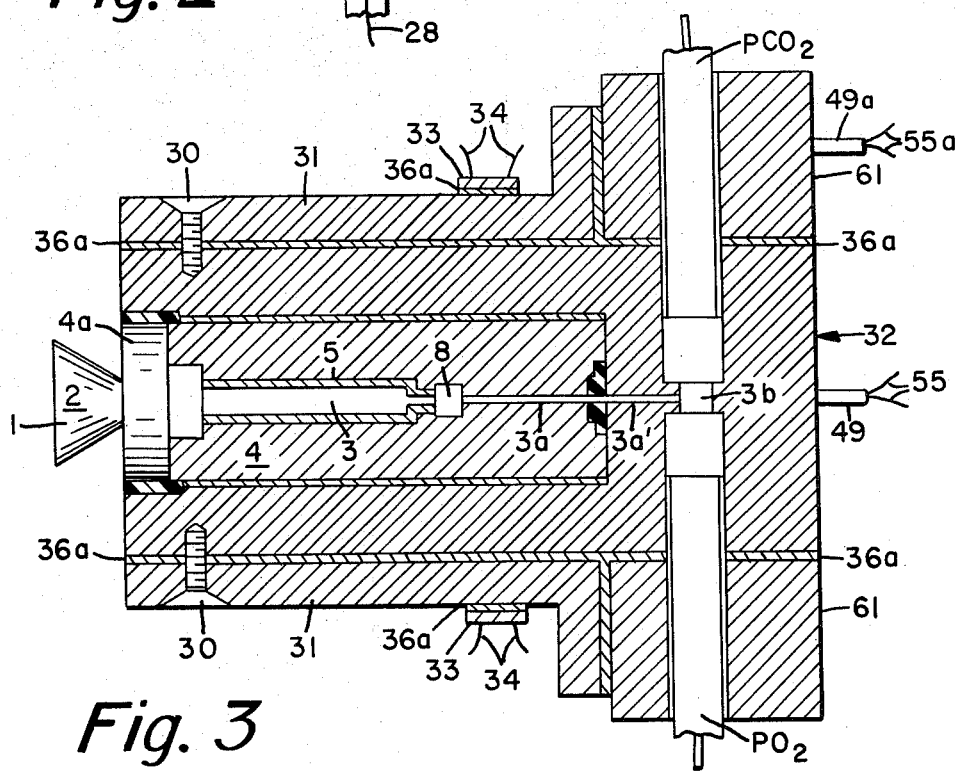
FIG. 3 is a horizontal cross-section of the measuring chamber housing shown in FIG. 2 taken through lines 3—3 of FIG. 2.

Both FIGS. 2 and 3 are schematic representation of a chamber which was made from a stainless steel chamber housing 32 which had dimensions of about 3 ¼ inches × 1 inch × 1 ½ inches. The length (3 ½ inches) is slightly longer than that needed to contain the actual overall measuring chamber 3–3a–3a'–3b (about 2 ½ inches) so that related structures can be attached to it. Preferably, the overall measuring chamber 3–3a–3a'–3b is less than about 2 ½ inches in length.

FIG. 3 is a downward view of a schematic horizontal cross-section of the measuring chamber housing of FIG. 2, taken through line 3—3 of FIG. 2, which shows the location of structures which could not be easily shown in FIG. 2.

The horizontal cross-section of FIG. 3 shows many of the structures (identically numbered) described in FIG. 2, plus the following structures: laterally attached through bolts 30 to the sides of the elongated rectangular sample chamber housing 32 are two L-shaped aluminum heat transfer blocks 31 which are preferably about ¼ inch thick. Attached to each of aluminum heat transfer blocks 31 are heating elements 33 having extending therefrom heating element leads 34 connectable to a power source not shown. The heating elements are known (e.g., power resistors) and serve to maintain the overall sample measuring chamber 3–3a–3a'–3b at a regulatable temperature which can be monitored through the thermistor 49 of FIG. 2. Their use avoids problems associated with water-bath temperature control systems known in the art.

In FIG. 3, there can also be seen the emerging portion of a conventional thermistor 49a, the heat-sensitive portion of which (not shown) extends into the PCO₂ housing block and is preferably within less than about one-fourth inch of the PCO₂ electrode. Emerging from the conventional thermistor 49a are two leads 55a which can be connected to an electronic temperature controlling device which can maintain the temperature of a sample at about 37°C. The thermistor 49a can be retained in place in the same manner as the conventional thermistor 49.

To assure rapid and even heat transfer from the heating elements 33 to the sample chamber housing 32 and the PCO₂ and PO₂ electrode housing blocks 61, (e.g., 1 ½ inches × 1 ½ inches × 3 ½ inches and 2 ½ inches) a thin coating of a heat sink compound 36a is placed between each heating element 33 and the L-shaped aluminum heat transfer blocks 31. The heat sink compound 36a (e.g., Dow Corning No. 340 Silicone heat sink compound) is also placed as a thin coat between the L-shaped aluminum heat transfer blocks 31 and the stainless steel sample measuring chamber housing 32. A thin coating of the heat sink compound 36a is also shown between the pH electrode assembly 4 and housing block 32.

As can be seen, the heat sink compound 36a is also between the aluminum gas electrode housing blocks 61 and the L-shaped aluminum heat transfer blocks 31.

The relative positions of the gas electrodes can be seen in FIG. 3. The PCO₂ and O₂ electrodes are inserted into gas electrode housing blocks and retained therein by conventional retaining means not shown (e.g., plastic electrode retainers similar to 38 of FIG. 2). The sensing portions of the gas electrodes form a portion of the inner wall of gas measuring chamber 3b. The gas electrode housing blocks 61 are made of aluminum and they may be secured to the sample chamber housing 32 by conventional means not shown (e.g., bolts). Heat sink compound 36a is placed between the gas electrode housing blocks 61 and sample chamber housing 32. The visible portions of gas electrode housing blocks 61 and the sample chamber housing 32 may be coated with Teflon.

The PCO₂ electrode, shown in block form in FIG. 3 is similar to the type originally developed by Stow and Severinghaus and it measures PCO₂ electrochemically in terms of pH units. The electrode employs a glass combination pH electrode (dip-type) with a bicarbonate electrolyte reservoir surrounding the pH electrode. The reservoir is filled with a buffered electrolyte solution which is constantly in contact with the pH sensitive glass. The tip of the pH electrode is encased in a gas permeable silastic membrane cup, separating it from the sample solution and forming a portion of the inner wall of gas measuring chamber 3b. A fiber spacer inserted between the pH tip and the silastic membrane provides the necessary area for reaction between the CO₂ of the sample and the buffered electrolyte solution.

Carbon dioxide passes from the sample being measured across the silastic membrane and combines with the bicarbonate solution to form carbonic acid. The magnitude of diffusion is directly proportional to the PCO₂ of the sample being measured.

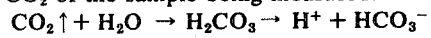

In the production of carbonic acid, the pH of the electrolyte solution is altered. The change in pH of this solution is measured by the pH electrode. The pH reading is then amplified and read out on a logarithmic scale in terms of mm Hg of CO₂. This conversion utilizes the relationship between the measured pH and the log of the sample PCO₂. The above-described PCO₂ electrode is well known and it, or its equivalent, may be used for PCO₂ measurements of the present invention.

The PO₂ electrode is a modification of the original Clark electrode. It measures the partial pressure of oxygen (PO₂) in both gaseous and liquid samples. The electrode promotes the selective reduction of oxygen by a polarographic method. The oxygen electrode breaks down the diffusing oxygen molecules and for this reason is referred to as a "consumptive" electrode.

The electrode conventionally consists of an outer glass shaft which forms an electrolyte reservoir enclosing two concentric half cells. A thin silastic gas-permeable membrane cup gaskets the open end of the glass reservoir. The opposite end is closed by a nylon cap, with the electrode leads passing through them.

One half cell consists of a silver/silver chloride anode, the other a platinum cathode or reduction terminal. Interposed between anode and cathode is an approximate 0.7 v potential. This battery provides the polarizing potential necessary for the reduction of oxygen; the anode being positive in respect to the cathode.

The electrode produces a current (amps) at the constant polarizing voltage (approximately 0.7v) which is proportional to the PO₂ of the sample being measured. Oxygen diffuses from the samples across the polypropylene outer membrane and electrolyte solution to the negatively charged Pt cathode. At the surface of the platinum cathode, the diffusing oxygen molecules gain electrons (e⁻) which cause a reduction of the oxygen. For every molecule of oxygen which diffuses to the cathode 4 electrons are necessary for its complete reduction:

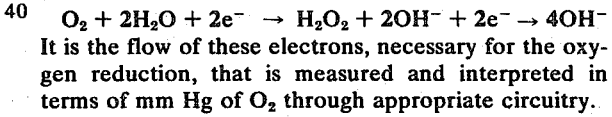

It is the flow of these electrons, necessary for the oxygen reduction, that is measured and interpreted in terms of mm Hg of O₂ through appropriate circuitry.

Like the PCO₂ electrode, the above PO₂ electrode is well known, and it, or its equivalent, may be used for PO₂ measurements of the present invention.

A general description of the flow-through pH electrode can be found in the literature (e.g., U.S. Pat. No. 3,357,910). Briefly, the pH electrode consists of a capillary sensor glass for measuring pH. The capillary tube is clad with a thin crystalline layer of silver halide (e.g., silver chloride) which is applied in a molten state. Coiled about the cladding is a silver wire which is then covered with a further cladding of the crystalline material which is in effect a fused electrolyte, by means of which hydrogen ion activity of a sample within the capillary is sensed through the pH sensitive glass. It has been found that the ratio of the fused electrolyte length (as a cladding on the capillary) to the length of the glass capillary (which is longer) is critical to accurate sensing. The preferred ratio of fused electrolyte cladding length to glass capillary length has thus been found to be less than 1:1.2.

The pH reference electrode R of FIG. 1 is a removeable structure and its general structure and function are known. It does, however, differ from commonly known electrodes in two respects. The reference electrode may use Normal Saline (0.16 M NaCl) as a reference electrode salt bridge instead of the commonly used saturated KCl bridge. The use and advantages of NaCl are more fully described in Clin. Chim. Acta., 28, pp. 373–390 (1970) which is incorporated by reference herein.

The second difference in the reference electrode found useful in the present invention is that the liquid junction is established by providing a controlled flow-through medium over which is secured a semipermeable membrane (e.g., cellophane) to provide a diffusion junction free from clogging in media such as blood. By controlling the diameter of an aperture between a sample being measured and the electrolyte of the reference electrode, it has been found that protein clogging problems and hysteresis are minimized. For further information on the control of reference electrode sensing operations see U.S. Pat. No. 3,505,196. It should be noted, however, that a conventional pH reference electrode may be used in the present invention and that the above-described variations are merely a preferred embodiment of the present system.

The relative positions of the various electrodes with respect to their common measuring chamber may be varied to suit specialized needs, e.g., it is not necessary that a sample, upon entry, first contact the sensitive portion of a pH electrode. The reference electrode, or the gas electrodes may be placed before the pH electrode. In a preferred embodiment all electrodes are placed as shown in FIGS. 2 and 3 about the common chamber and they are placed as close together as practical to permit the measurements of samples within a small sample chamber volume. More preferably, the electrodes are arranged so that the total sample volume (measuring chamber 3–3a–3a'–3b) is less than about 220 microliters and the total length of the sample is less than about 2 ½ inches from the entrance to the flow-through pH electrode to the portion of the measuring chamber 3b (or subchamber) where gas measurements are taken.

Although the disclosed system preferably and ideally suited for measuring small blood samples, it can be appreciated that other fluids may be similarly measured as long as their pH, $PCO_2$, and $PO_2$ values are within the sensing ranges of, and compatible with, the electrodes used.

The electronic circuitry and analogue calculators associated with the output of the electrodes are known in the art and a detailed discussion concerning them may be found in the papers cited under prior art and elsewhere.

Briefly, it is known pH, $PCO_2$, and $HCO_3^-$ can be related through the so-called Henderson-Hasselbach equation. By knowing two of the above values, the third can be calculated according to the equation $$pH = pk + \log [HCO_3^-]/[H_2CO_3]$$

It can be shown both theoretically and experimentally that the amount of carbonic acid dissolved in the blood system is proportionate to the amount of dissolved carbon dioxide present in the blood. Thus, the above denominator can be changed to a function of $CO_2$:

$$pH = pk + \log [HCO_3^-]/[CO_2]$$

Accordingly, the amount of dissolved carbon dioxide is dependent upon the $PCO_2$.

$$pH = pk + \log [HCO_3^-]/a\, PCO_2$$

where (a) represents the proportionate amount of $PCO_2$ necessary to dissolve $CO_2$ in plasma. This has been calculated to be equal to 0.03 at 37°C. The equation is now in terms of two variables (pH and $PCO_2$) which are measured and from which the $HCO_3^-$ can be calculated:

$$pH = pk + \log [HCO_3^-]/a\, PCO_2$$

Thus, an analogue calculator can be programmed to solve for $HCO_3^-$ where pH and $PCO_2$ are known. The calculator is represented by box B of FIG. 1.

In a like manner, it is known that total $CO_2$ can be derived from known $HCO_3^-$ and $PCO_2$. Thus, if inputs from $PCO_2$ and $HCO_3^-$ are fed into a properly programmed analogue calculator, total $CO_2$ can be derived and, with appropriate circuitry, digitally displayed. See Box C of FIG. 1.

Lastly, inputs from $HCO_3^-$ and pH can be fed into a programmed analogue calculator to calculate and display excess base. See Box D of FIG. 1.

The use of the above calculators, and associated circuitry, and outputs from the pH, $PCO_2$, and $PO_2$ electrodes permit the digital display for the six values shown in the boxes in the lower right portion of FIG. 1.

The above-described system for making measurements of blood has been found to give very speedy and accurate results. For example, all six measurements (pH, $PCO_2$, $PO_2$, $HCO_3^-$, total $CO_2$ and base excess) may be made in a period less than 90 seconds on a sample of blood as small as about 175 to 200 microliters. The pH is measureable with ±0.001 resolution, repeatable to ±0.002. Resolution of $PCO_2$ and $PO_2$ is ±0.1 mm and repeatable to ±0.2 mm. Since all outputs can be expressed digitally through known circuitry, there is no need to use nonograms, charts, graphs, and interpolations. Because of digital displays, parallox errors are avoided. Because pH and $PCO_2$ are expressed with extreme accuracy, the derived values for $HCO_3^-$, total $CO_2$ and base excess are accordingly expressed more accurately.

Because of the novel unitary construction of the measuring chamber and the associated micro-sampler, flush and vacuum systems, there is provided a control over even very small samples, e.g., a sample cannot be inadvertently lost because its removal is controlled semi-automatically thus allowing remeasurements. Also, the inconveniences associated with using water baths are avoided by using the disclosed electrical heating system. Thus, water leakage problems and the possibility of temperature gradients are eliminated.

As noted above, one of the more critical features of the present invention is the common measuring chamber disclosed in FIGS. 2 and 3 and described above. Within the measuring chamber rapid temperature equilibration is easily provided and, by preferably coating the inner surface of the gas measuring chamber 3b with Teflon or the like material, a smooth, bubble free flow path is assured. Further, by providing a sample chamber housing of the type generally disclosed, the electrodes and related structures can be easily and conveniently removed for inspection, repair, or replacement. Lastly, all six values of a blood sample can be determined from a single sample of blood which is maintained in a stationary position within a common measuring chamber, thus avoiding risks of measurement errors that can accompany the movement of a single sample from one measuring chamber to another (e.g., minor temperature gradients).

Various modifications and additions may be made to the above-described system without departing from the scope of the invention disclosed. Accordingly, it is intended that the disclosure presented herein shall be interpreted in an illustrative and not in a limiting sense.

We claim:

1. In an electrode system for the electrochemical analysis of a single stationary sample of blood which comprises means defining a measuring chamber for the blood sample, a $PCO_2$ electrode, a $PO_2$ electrode, a pH electrode, and a pH reference electrode, each of the electrodes having sensitive portions exposed to the measuring chamber, thereby making the measuring chamber common to all the electrodes, the improvements wherein the pH electrode is a flow-through pH electrode having a hydrogen ion sensitive surface defining a portion of the common measuring chamber and the pH reference electrode has a liquid junction portion exposed to the common measuring chamber through a semipermeable membrane between an electrolyte contained in the reference electrode and the common measuring chamber, the surface area of the electrolyte which contacts the membrane being less than the surface area of the membrane exposed to the common measuring chamber.

2. The electrode system of claim 1 wherein the membrane between the electrolyte contained in the reference electrode and the common measuring chamber is a semipermeable cellophane membrane.

3. The electrode system of claim 1 wherein the electrolyte contained in the reference electrode is a 0.16M NaCl solution.

4. The electrode system of claim 1 wherein the common measuring chamber has two end portions and terminates at one end as a cavity having an inlet passageway and an outlet passageway, the inlet passageway being continuous with and defining a portion of the common measuring chamber.

5. The electrode system of claim 4 wherein the measuring chamber is less than about 2 ½ inches in length.

6. The electrode system of claim 4 wherein the cavity is cylindrical.

7. The electrode system of claim 6 wherein the sensing portions of the $PCO_2$ and $PO_2$ electrodes define portions of the cylindrical cavity at opposite ends of the cavity.

8. The electrode system of claim 6 wherein the inlet passageway feeds into the cylindrical cavity substantially tangentially.

9. The electrode system of claim 1 wherein the flow-through pH electrode has a ratio of fused electrolyte cladding length to glass capillary length of less than 1:1.2.

10. In an electrode system for the electrochemical analysis of a single stationary sample of blood which comprises means defining a measuring chamber for the blood sample, a $PCO_2$ electrode, a $PO_2$ electrode, a pH electrode, and a pH reference electrode, each of the electrodes having sensitive portions exposed to the measuring chamber, thereby making the measuring chamber common to all the electrodes, the improvements comprising in combination:

a. the pH electrode being a flow-through pH electrode having a hydrogen ion sensitive surface defining a portion of the common measuring chamber;

b. the pH reference electrode having a liquid junction portion exposed to the common measuring chamber through a semi-permeable membrane between an electrolyte contained in the reference electrode and the common measuring chamber, the surface area of the electrolyte which contacts the membrane being less than the surface area of the membrane exposed to the common measuring chamber, said common measuring chamber having an entrance passageway and an exit passageway;

c. a peristaltically activated micro-sampling pump communicating with the exit passageway of the common measuring chamber;

d. vacuum means communicating with the exit passageway beyond the pump;

e. a liquid flushing system communicating with the entrance passageway of the common measuring chamber, the flush system being activatable with and by the vacuum means;

f. circuitry electrically associated with the electrodes to determine and display pH, $PCO_2$, and $PO_2$ values of a sample in the chamber;

g. calculators adapted to receive and apply values from the pH and $PCO_2$ electrodes to calculate values for $HCO_3^-$, total $CO_2$, and base excess; and h. circuitry electrically associated with the calculators of (g) to display the $HCO_3^-$, total $CO_2$, and base excess values.

* * * * *